US010395393B2

United States Patent
Ma et al.

(10) Patent No.: US 10,395,393 B2
(45) Date of Patent: Aug. 27, 2019

(54) METHOD FOR ASSESSING THE QUALITY OF AN IMAGE OF A DOCUMENT

(71) Applicants: Jianglin Ma, Louvain-la-Neuve (BE); Michel Dauw, Machelen (BE)

(72) Inventors: Jianglin Ma, Louvain-la-Neuve (BE); Michel Dauw, Machelen (BE)

(73) Assignee: I.R.I.S., Mont-Saint-Guibert (BE)

( * ) Notice: Subject to any disclaimer, the term of this patent is extended or adjusted under 35 U.S.C. 154(b) by 43 days.

(21) Appl. No.: 15/387,990

(22) Filed: Dec. 22, 2016

(65) Prior Publication Data
US 2018/0182086 A1 Jun. 28, 2018

(51) Int. Cl.
G06K 9/00 (2006.01)
G06K 9/03 (2006.01)
G06K 9/38 (2006.01)
G06T 9/00 (2006.01)

(52) U.S. Cl.
CPC ............ *G06T 9/00* (2013.01); *G06K 9/00456* (2013.01); *G06K 9/036* (2013.01); *G06K 9/38* (2013.01); *G06K 2209/01* (2013.01)

(58) Field of Classification Search
None
See application file for complete search history.

(56) References Cited

U.S. PATENT DOCUMENTS

| 9,418,310 B1* | 8/2016 | Chen .................... G06K 9/4638 |
| 2008/0273807 A1 | 11/2008 | Dauw et al. |
| 2012/0063686 A1* | 3/2012 | Dauw ................ G06K 9/00456 382/200 |
| 2018/0157906 A1* | 6/2018 | Loginov ............ G06K 9/00442 |

OTHER PUBLICATIONS

Kang, Le, et al. "A deep learning approach to document image quality assessment." Image Processing (ICIP), 2014 IEEE International Conference on. IEEE, 2014.*
Blando, Luis R., Junichi Kanai, and Thomas A. Nartker. "Prediction of OCR accuracy using simple image features." Document Analysis and Recognition, 1995., Proceedings of the Third International Conference on. vol. 1. IEEE, 1995.*
(Continued)

*Primary Examiner* — Vu Le
*Assistant Examiner* — Tracy Mangialaschi
(74) *Attorney, Agent, or Firm* — Sriplaw, P.A.

(57) ABSTRACT

A comprising: processing the image to a text image with a number of text blobs; classifying the text blobs based on a calculation as to whether they will belong to a foreground layer or to a background layer in OCR processing; and generating a quality value of the image based on the classified text blobs. By generating the quality value based on the classified text blobs, pictures in the image, which are not relevant for OCR are not taken into account for assessing the quality of the image. The amount of data to be processed is thereby decreased resulting in a method which can be executed in real-time. Furthermore, as the quality assessment criterion is based on the division of blobs into a foreground and a background layer, i.e. on prior knowledge of the OCR system, it provides a good indication for OCR accuracy.

15 Claims, 6 Drawing Sheets

(56) References Cited

OTHER PUBLICATIONS

Lazzara, Guillaume, and Thierry Geraud. "Efficient multiscale Sauvola's binarization." International Journal on Document Analysis and Recognition (IJDAR) 17.2 (2014): 105-123.*

Kumar, Deepak, and A. G. Ramakrishnan. "Quad: Quality assessment of documents." International Workshop on Camera based Document Analysis and Recognition. 2011.*

Nayef, Nibal, and Jean-Marc Ogier. "Metric-based no-reference quality assessment of heterogeneous document images." Document Recognition and Retrieval XXII. vol. 9402. International Society for Optics and Photonics, 2015.*

Andrea Souza, Mohamad Cheriet, Satoshi Naoi, and Ching Y. Suen; "Automatic Filter Selection Using Image Quality Assessment"; Proceedings of the Seventh International Conference on Document Analysis and Recognition, 2003; Montreal, Quebec, Canada, Kawasaki, Japan.

Dan S. Bloomberg; "Multiresolution Morphological Approach to Document Image Analysis"; 1991, Palo Alto, California, USA.

J. Sauvola, M. Pietikainen; "Adaptive Document Image Binarization"; Pattern Recognition 33 (2000), pp. 225-236, Pergamon/Elsevier; Oulu, Finland.

Nibal Nayef, Jean-Marc Ogier; "Metric-Based No-Reference Quality Assessment of Heterogeneous Document Images"; Document Recognition and Retrival XXII, vol. 9401, 94020L, 2015, Cedex, France.

Niranjan D. Narvekar and Lisa J. Karam; A No-Refemce Image Blur Metric Based on the Cumulative Probability of Blur Detection (CPBD); IEEE Transactions on Image Processing, pp. 2678-2683, vol. 20, No. 9, Sep. 2011.

Rania Hassen, Zhou Wang, and M.M.A. Salama; "Image Sharpness Assessment Based on Local Phase Coherence"; IEEE Transactions on Image Processing, Mar. 2012, pp. 1-13.

Rony Ferzli and Lina J. Karam, "A No-Reference Objective Image Sharpness Metric Based on Just-Noticeable Blur and Probability Summation"; ICIP 2007; 1-4244-1437-7/07, pp. III-445 to III-448, Tempe, AZ.

Xujun Peng, Huaigu Cao, Krishna Subramanian, Rohit Prasad, and Prem Natarajan; "Automated Image Quality Assessment for Camera-Captured OCR"; Conference Paper—2011 18th IEEE International Conference on Image Processing—Jan. 2011; pp. 1 and 2621-2624, Cambridge, MA.

Ziang Zhu, Peyman Milanfar; "Automatic Parameter Selection for Denoising Algorithms Using a No-Reference Measure of Image Content"; IEEE Transactions on Image Processing, vol. 19, No. 12, Dec. 2010; pp. 3116-3132.

* cited by examiner

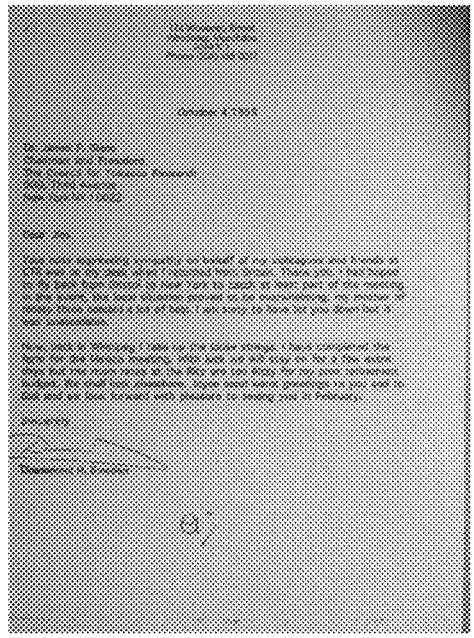
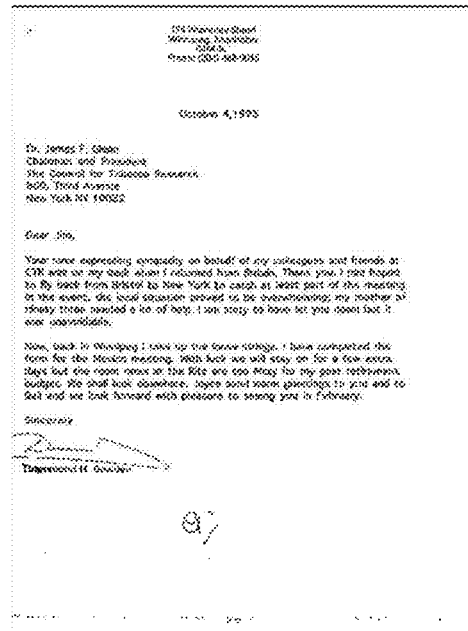
*Fig. 1a*  *Fig. 1b*
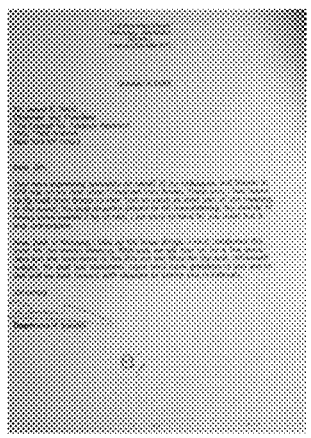
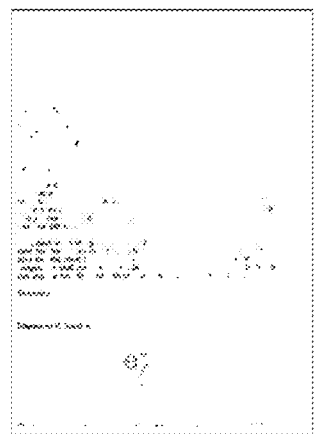
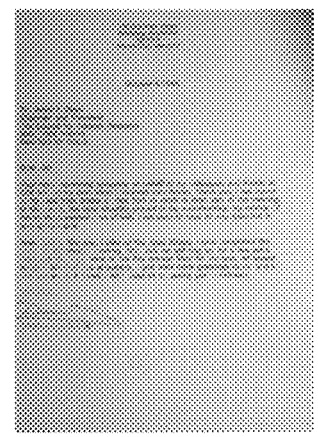
*Fig. 2a*  *Fig. 2b*  *Fig. 2c*

METHOD FOR ASSESSING THE QUALITY OF AN IMAGE OF A DOCUMENT

TECHNICAL FIELD

The present invention relates to a computer-implemented method for assessing the quality of an image of a compound document that includes pictures and/or texts. In particular, the present invention relates to a quality assessment method to indicate if the image can be used for OCR scanning.

BACKGROUND ART

Methods for assessing the quality of an image of a compound document are typically used to predict Optical Character Recognition (OCR) accuracy. Research into document image quality assessment has been extensive since scanned document images have been available. However, recently, as mobile devices, such as smart phones and compact digital cameras, are becoming more and more popular, interest into quality assessment methods for document images from these devices has increased.

For example, more and more employees that are traveling out of the office on a business trip are taking pictures of important documents with their smartphone or tablet cameras and are sending these to their company for specific processing. As such, in this scenario, it is critical that the pictures sent by the employees have a high enough quality for subsequent processing such as OCR, document information extraction and classification, manual examination, etc. Therefore, an accurate document image quality assessment method is critical and should be performed on the mobile device.

The known methods include, in general, two steps. Firstly, features which represent the degradation of document images will be extracted. Secondly, the extracted features are linked to the OCR accuracy. The first step may be performed using image sharpness based methods, character based methods, hybrid methods or feature-learning based methods. While the second step may be performed using either learning based methods or empirical methods.

J. Kumar, F. Chen, and D. Doermann, "Sharpness Estimation for Document and Scene Images", Proc. ICPR, pp. 3292-3295, 2012 describe a sharpness based method that calculates the change in grayscale values, i.e. the disparity, that is observed at an edge of a character in a document image. While this method obtains good results and is fast to calculate, several parameters need to be set in order to obtain the best results.

Other sharpness based methods are described more generally with respect to images, but have also been applied to document images. Examples are R. Ferzli and L. Karam, "A no-reference objective image sharpness metric based on the notion of just noticeable blur (jnb)", IEEE Tran. on Image Processing, 18, pp. 717-728, 2009; X. Zhu and P. Milanfar, "Automatic parameter selection for denoising algorithms using a no-reference measure of image content", IEEE Transactions on Image Processing, 19(12), pp. 3116-3132, 2010; N. Narvekar and L. Karam, "A no-reference image blur metric based on the cumulative probability of blur detection (cpbd)", IEEE Tran. on Image Processing, 20(9), pp. 2678-2683, 2011; and R. Hassen, Z. Wang, and M. Salama, "Image sharpness assessment based on local phase coherence", Image Processing, IEEE Transactions on 22(7), pp. 2798-2810, 2013. One limitation of these methods is that the different criteria used for quality assessment are very slow to calculate. Furthermore, these methods do not consider the characteristics of document images, and therefore, when they are applied on document images, they may not be valid.

L. R. Blando, J. Kanai, T. A. Nartker, and J. Gonzalez, "Prediction of OCR accuracy," tech. rep., 1995; M. Cannon, J. Hochberg, and P. Kelly, "Quality assessment and restoration of typewritten document images," International Journal on Document Analysis and Recognition 2(2-3), pp. 80-89, 1999; and A. Souza, M. Cheriet, S. Naoi, and C. Y. Suen, "Automatic filter selection using image quality assessment," Proceedings of ICDAR 1, pp. 508-512, 2003 describe character based methods which have been specifically designed for scanned document images, but may also be applied to camera document images. These methods rely on calculating measurements that represent characteristics in which poor OCR is expected, such as fat, i.e. thick, stroke characters which tend to have many touching characters; and/or broken characters which are usually fragmented into small pieces. However, these methods operate on a binarized image with the assumption that the captured colour or grayscale image has been properly binarized, which might not be the case in real situations.

N. Nayef and J. Ogier, "Metric-based no-reference quality assessment of heterogeneous document images", Proc. SPIE 9402, Document Recognition and Retrieval XXII, 94020L, Feb. 8, 2015; and X. Peng, H. Cao, K. Subramanian, R. Prasad, and P. Natarajan. "Automated image quality assessment for camera-captured OCR." Proc. ICIP, pp. 2621-2624, 2011 describe hybrid methods which combine image sharpness based methods and character based methods. First, the sharpness of the image is calculated, and after that character-based quality metrics are estimated. Finally, these two measurements are combined to represent the image quality. While these hybrid methods are well suited for predicting OCR accuracy of camera document images, they also suffer from the same disadvantages as the image sharpness based methods and character based methods.

P. Ye and D. Doermann, "Learning features for predicting OCR accuracy," in 21st International Conference on Pattern Recognition (ICPR), pp. 3204-3207, 2012; and L. Kang, P. Ye, Y. Li, and D. Doermann, "A deep learning approach to document image quality assessment," in Image Processing (ICIP), 2014, IEEE International Conference on, pp. 2570-2574 describe feature-learning based methods. While these methods are promising, they take a long time to set up as the systems need to be trained by processing numerous images.

After the necessary features have been extracted, the image quality assessment measurement needs to be linked to the extracted features. This can be done using empirical methods that calculate the weighted sum of the extracted features, and proving that this measurement is correlated to OCR accuracy. In particular, the weighting factor for each extracted feature, i.e. a feature that expresses a deterioration level, may be estimated experimentally using the least square method. A disadvantage of these methods is that the weighting factors are tuneable parameters that need to estimated using experiments. As such, these methods may take a long time to set up.

Alternatively, learning based quality assessment prediction methods do not assume that the quality assessment prediction is linearly correlated with the extracted normalized features. Rather, a more complicated mapping function is built to link the multiple dimension extracted features with the quality assessment measurement or OCR accuracy. As with the feature-learning based methods, systems using these methods take a long time to set up as the systems need to be trained by processing numerous images.

DISCLOSURE OF THE INVENTION

It is an object of the present invention to provide an accurate quality assessment method for assessing the quality of an image of a compound document which may be executed in real-time.

This object is achieved according to the invention with a computer-implemented quality assessment method for assessing the quality of an image for OCR processing, the method comprising the steps of: a) processing the image to a text image comprising a number of text blobs; b) classifying the text blobs in the text image in a first and second type of text blobs based on a calculation as to whether they will belong to a foreground layer in the OCR processing or to a background layer in the OCR processing; and c) generating a quality value of the image based on the classified text blobs.

By generating the quality value based on the classified text blobs, pictures in the image, which are not relevant for OCR are not taken into account for assessing the quality of the image. By generating the quality value based on the text image pictures in the image, which are not relevant for OCR, are not taken into account for assessing the quality of the image. Furthermore, the quality assessment criterion is based on prior knowledge of the OCR system, as it is based on the division of blobs into a foreground and a background layer and therefore provides a good indication for OCR accuracy.

In an embodiment, step b) comprises: b1) calculating a text compression cost and a picture compression cost for each text blob; b2) calculating a ratio of the text compression cost and the picture compression cost for each text blob; b3) comparing said ratio to a predetermined threshold to determine if said ratio is less than the predetermined threshold; b4) classifying said text blob as a second type blob if the ratio is less than the predetermined threshold; and b5) classifying said text blob as a first type blob if the ratio is not less than the predetermined threshold.

In a preferred embodiment, step b1) comprises: b11a) calculating a background compression cost for each text blob; b12a) calculating a foreground compression cost for each text blob; and b13a) calculating a mask compression cost for each text blob. Preferably, step b11a) comprises calculating a sum of squares of grayscale differences between a target pixel in said text blob and its eight touching pixels, step b12a) comprises calculating a sum of squares of grayscale differences between a grayscale value of a target pixel in said text blob and an average grayscale value of pixels in the text blob, and step b13a) comprises calculating a perimeter of said text blob.

In an alternative preferred embodiment, step b1) comprises: b11b) calculating a surrounding compression cost for each text blob; b12b) calculating a foreground compression cost for each text blob; and b13b) calculating a mask compression cost for each text blob. Preferably, step b11b) comprises calculating a sum of squares of grayscale differences between surrounding pixels and an average color of the surrounding pixels multiplied by a pre-set factor, the surrounding pixels being background pixels near an edge of the text blob, step b12b) comprises calculating a sum of squares of grayscale differences between a grayscale value of a target pixel in said text blob and an average grayscale value of pixels in the text blob, and step b13b) comprises calculating a perimeter of said text blob.

In an embodiment, step c) comprises calculating a ratio of the number of first type blobs to the total number of text blobs.

In an embodiment, the image is a color image and step a) comprises processing the image to form a grayscale image.

In this embodiment, a quality value can also be derived for color images.

In an embodiment, step a) further comprises: a1) binarizing the image to form a binary image; and a2) separating text elements from the binary image to form a text image.

In a preferred embodiment, step a2) comprises: a21) identifying blobs in the binary image; and a22) classifying each blob as one of a pictorial element and a textual element.

In a further preferred embodiment, step a22) comprises: classifying each blob as a pictorial element if the area of said blob is too large or too small compared to predefined thresholds.

In a further preferred embodiment, step a22) further comprises: calculating a stroke of each blob; and classifying each blob as a pictorial element if the stroke of said blob is too large compared to a predefined threshold.

In a further preferred embodiment, step a22) further comprises: calculating a width and a height of each blob; and classifying each blob as a pictorial element if at least one of the width and the height of said blob is too large compared to a predefined threshold.

In an advantageous embodiment, the image (1) is divided into at least two image patches; and a quality value of each image patch is generated according to the method described above.

In this advantageous embodiment, it is possible to identify higher and lower quality patches in the image.

It is another object of the present invention to provide a quality assessment method for assessing the quality of an image of a compound document which may be executed in real-time.

This object is achieved according to the invention with a computer-implemented quality assessment method for assessing the quality of a compound document image, the method comprising the steps of: i) separating the compound document image into a text image and a picture image; and ii) generating a quality value of the compound document image by assessing the quality of the text image.

By generating the quality value based on the text image pictures in the image, which are not relevant for OCR, are not taken into account for assessing the quality of the image. As such, the amount of data to be processed is decreased thereby resulting in a method which can be executed in real-time.

BRIEF DESCRIPTION OF THE DRAWINGS

The invention will be further explained by means of the following description and the appended figures.

FIG. 1a shows a high quality image taken by a camera of a compound document.

FIG. 1b shows the mask image identified by Intelligent High Quality Compression (iHQC) described in EP-A-2800028 (or US 2008/0273807 A1) of the high quality image in FIG. 1a.

FIG. 2a shows a low quality image taken by a camera of the same compound document as in FIG. 1a.

FIGS. 2b and 2c respectively show a mask image identified by iHQC and a background image identified by iHQC of the low quality image in FIG. 2a.

DESCRIPTION OF THE INVENTION

Figure 3:
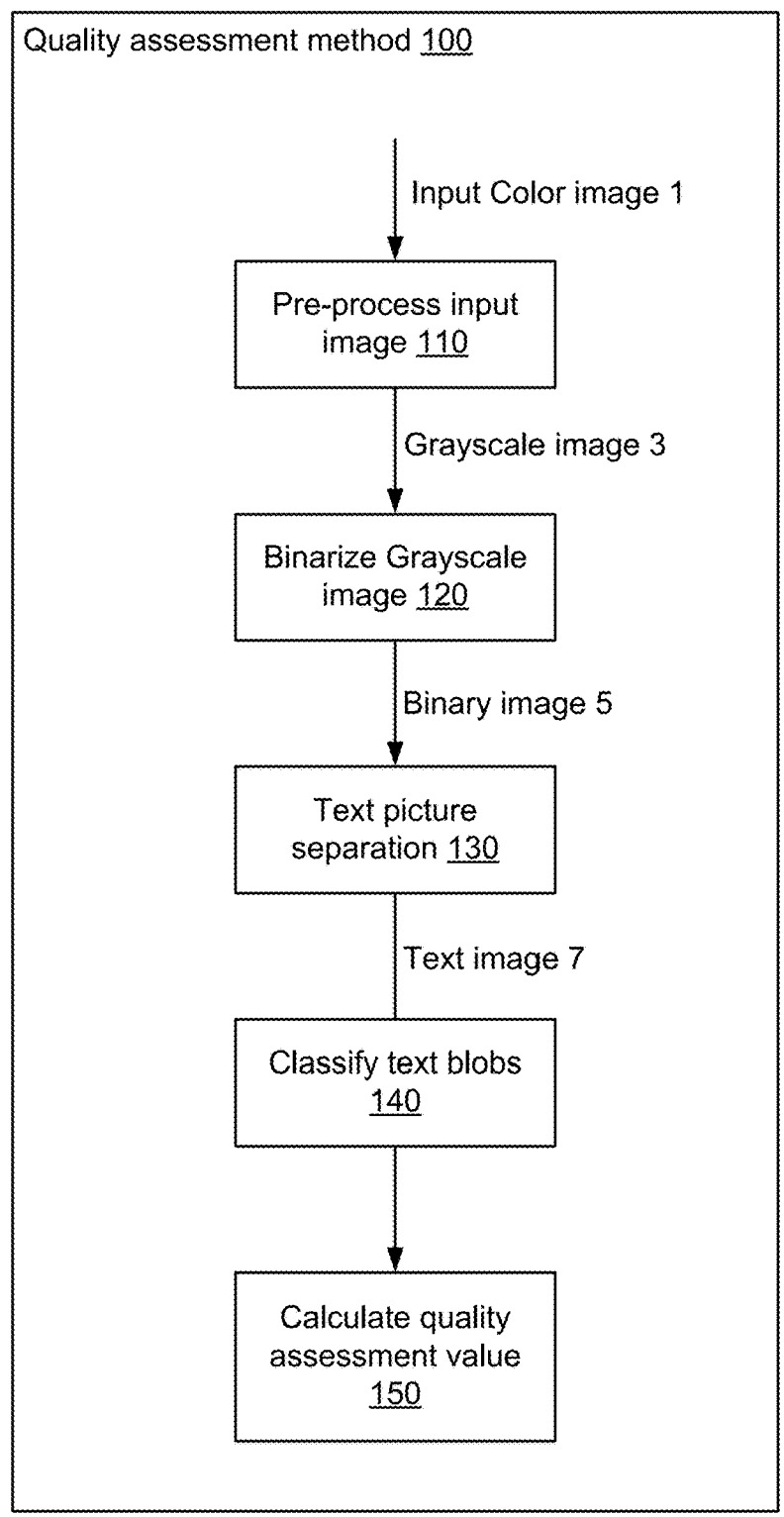
FIG. 3 shows a general flowchart of an image quality assessment method according to the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

As used herein, the term "color image" is intended to mean a color raster image, i.e. a pixel map with each pixel representing a color value.

As used herein, the term "grayscale image" is intended to mean a pixel map with each pixel representing an intensity value.

As used herein, the term "binary image" is intended to mean a bi-tonal image, for example a black & white image, i.e. a pixel map with each pixel representing a binary value (ON or OFF, 1 or 0, black or white).

As used herein, the term "binarization" is intended to refer to an operation that transforms a color or grayscale image into a binary image.

As used herein, the term "text image" is intended to mean a binary image including only textual elements.

A known compression method used in conjunction with OCR for scanned document images is the intelligent High Quality Compression (iHQC) method described in EP-A-2800028 (or US 2008/0273807 A1). A key component of iHQC is the implementation of a Mixed Raster Content (MRC) model of ITU-TT.44. According to this model, the document image is divided into layers: a binary mask image layer, a foreground image layer and a background image layer.

As used herein, the term "mask image" is intended to refer to a binary image generated in the iHQC method from the foreground objects, the foreground objects usually being black and white textual elements. An ON pixel in the binary mask layer indicates that, when decompressing, the color has to be taken from the foreground layer. An OFF pixel in the binary mask layer indicates that, when decompressing, the color has to be taken from the background layer.

As used herein, the term "foreground image" is intended to refer to the color image generated in the iHQC method that represents the color information of foreground objects.

As used herein, the term "background image" is intended to refer to the color image generated in the iHQC method from the background objects, the background objects usually being either colors of background elements or pictures.

As used herein, the term "blob" is intended to refer to a region of connected pixels, i.e. pixels having the same value (e.g. either 0 or 1), in a binary image.

In the iHQC method, the foreground image and the background image are compressed using JPEG2000, while the mask image is compressed using JBIG2. Afterwards, OCR can be done on the mask image which should contain all the textual elements.

However, when the iHQC method is applied to camera document images, the separation results are dependent on the quality of the image as illustrated by FIGS. 1a, 1b and 2a to 2c. FIG. 1a shows a high quality image taken from the publicly available DIQA database (J. Kumar, P. Ye, and D. Doermann, "DIQA: Document image quality assessment datasets," http://lampserv02.umiacs.umd.edu/projdb/project.phpPid=73) and FIG. 1b shows the mask image identified by the iHQC method. It is clear that the mask image contains all the textual elements, i.e. all the alphanumeric characters, and is useable for OCR. FIG. 2a shows a low quality, i.e. a blurred, image of the same document as used for the image in FIG. 1a (the image is again taken from the DIQA database). FIGS. 2b and 2c respectively show the mask image and the background image identified by the iHQC method. It is clear that, due to the blurriness of the image, many of the textual elements have been classified as pictorial elements and placed in the background image. As such, the mask image does not contain all the textual elements and is not useable for OCR.

Based on the above example, if the majority of textual elements are placed in the mask image and only a few of the textual elements are placed in the background image, the image has a good quality. Preferably, for a perfect quality image, none of the textual elements are placed in the background image.

Based on this general rule, a quality assessment method 100, as shown in FIG. 3, has been derived, which method 100 can be used for assessing the quality of inputted color or grayscale images in order to predict how accurate the input image could be processed using OCR.

In step 110, an input color image 1 is pre-processed. This pre-processing may include noise reduction, image enhancement, image deconvolution, color image transformation, etc.

In a preferred embodiment, when the inputted image 1 is a color image, it will be transformed into grayscale image 3. Alternatively, if the inputted image 1 is already a grayscale image, this transformation may be skipped.

In step 120, the grayscale image 3 is binarized. In the art, several binarization methods are known, such as the Sauvola method proposed by J. Sauvola and M. Pietikainen, "Adaptive document image binarization", Pattern Recogn. 33, pp. 225-236, 2000; or the multi-scale Sauvola method proposed by G. Lazzara and T. Geraud, "Efficient multiscale Sauvola's binarization," Springer-Verlag Berlin Heidelberg, 2013; or the binarization method using an adaptive local algorithm described in EP-A-2800028. The result of step 120 is a binary image 5.

In step 130, the binary image 5 is separated into a text image 7 and a picture image. This separation is based on a number of text blob filtering rules on binary image and its connected components as described below. In an alternative embodiment, the text-picture separation can also be performed without using filtering rules, for example by using a multi-resolution morphological method as described below.

In step 140, blobs are identified in the text image 7 and each blob is classified into a first type and a second type of blob, namely text-compression-prone blobs and picture-compression-prone blobs. This classification is based on the compression cost if the blob would be compressed as a textual element and the compression cost if the blob would be compressed as a pictorial element.

In step 150, a quality assessment value is calculated based on the classification of the blobs. As stated above, as a general rule in the iHQC method, if the majority of blobs of a text image are placed in the mask image, i.e. they are classified as textual elements, i.e. text-compression-prone blobs, and only a few of the blobs are placed in the background image, i.e. they are classified as pictorial elements, i.e. picture-compression-prone blobs, the image has a good quality. As such, the ratio of the number of text-compression-prone blobs to the total number of blobs may be regarded as a document image quality criterion.

The quality assessment method 100 has the advantage that, due to the removal of pictures, the quality assessment is only performed on a text image. As such, pictures in the document image which are not relevant for OCR are not taken into account for assessing the quality of the document image. Furthermore, the quality assessment criterion is based on prior knowledge of the OCR system, as it is based on the compression cost and, as such, provides a good indication for OCR accuracy, as will be shown below.

In particular, the quality assessment method 100 focuses mainly on one aspect of image deterioration, namely the blurring effect. Other deterioration factors such as geometric distortion, heavy noise, and low-contrast are not taken directly into account in the quality assessment value output from this method.

FIGS. 4a to 4c and 5a to 5c illustrate the binarization of step 120 using the Sauvola method and the multi-scale Sauvola method on a camera image of a compound document and a camera image of a color document respectively.

The Sauvola method is a known image binarization method and is based on the idea that every pixel within the image should have its own binarization threshold, which is determined by local statistics and configurations. The threshold formula is:

$$t(x, y) = m(x, y)\left[1 + k\left(\frac{s(x, y)}{R} - 1\right)\right] \quad (1)$$

with m(x,y) being the mean of the intensity of the pixels within a w*w window, s(x,y) being the standard deviation of the intensity of the pixels within the w*w window, R being the maximum standard deviation, and k being an arbitrary constant in a range of 0.01 to 0.5, this range is based on empirical findings and is already known to a person skilled in the art.

Figure 4A:
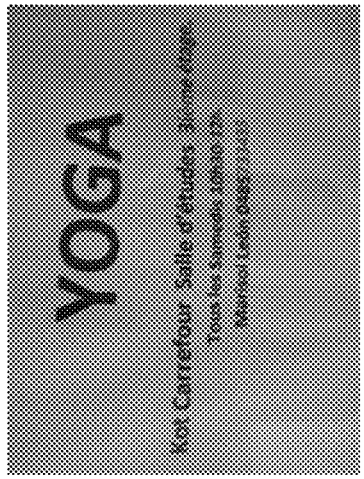
FIGS. 4a to 4c respectively show a grayscale camera compound document image, a binary image of this document using the Sauvola method and a binary image of this document using the multi-scale Sauvola method.
Figure 4B:
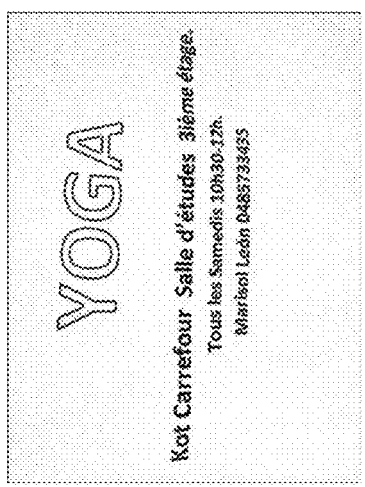
Figure 4C:
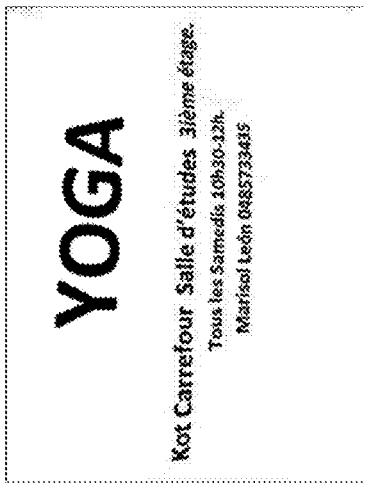
Figure 5A:
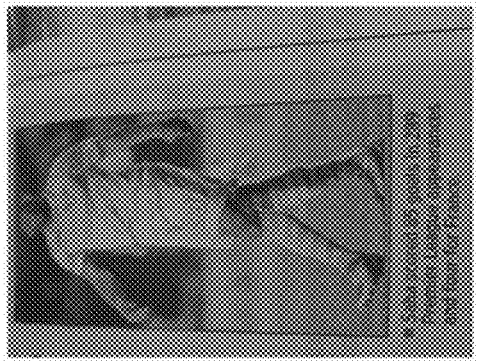
FIGS. 5a to 5c respectively show a color camera document color image, a binary image of this document using the Sauvola method, and a binary image of this document using the multi-scale Sauvola method.
Figure 5B:
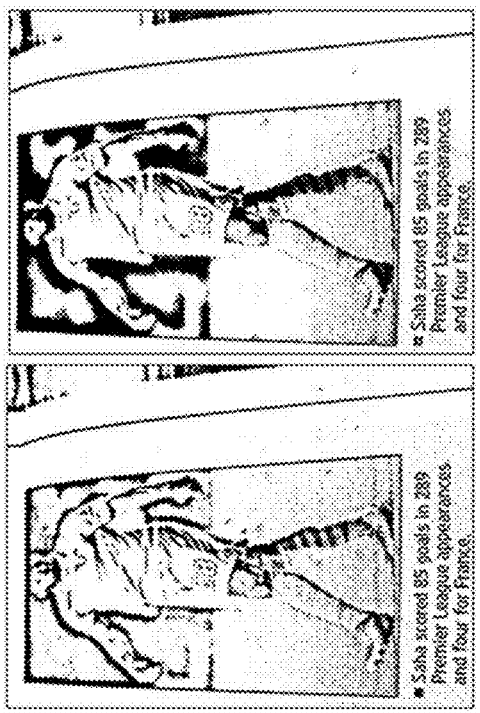
Figure 5C:
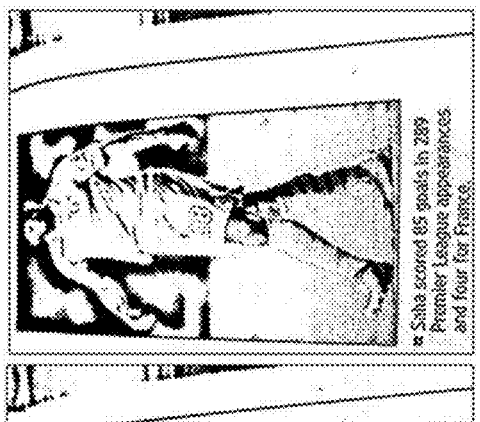

In order to obtain good binarization results, the parameters w and k have to be adjusted carefully. As a general rule for setting these two parameters: w should be set larger than the stroke of the character and k should be set small on the textual regions while it should be set relatively large on non-text regions. However, as the stroke of the text characters and the location of the text characters are unknown, setting these parameters is not easy. For example, when w is too small compared to the stroke of the text characters, the Sauvola method will generate a binary image 5 with hollow text characters as shown in FIG. 4b. Furthermore, when k is set too small, the output binary image 5 comprises noise in its background, while, when k is set too large, the output binary image 5 has a clear background, but some text elements may not be retrieved anymore.

Therefore, in a preferred embodiment, the binarization in step 120 is based on the multi-scale Sauvola method, which was designed to overcome the w setting problem. The basic idea behind this method is that, instead of using a fixed window size for all the pixels in the image, each pixel in the image has its own adaptive window. If the pixel is part of a wide text character, a large window is used; otherwise a smaller window is used. As such, the multi-scale Sauvola method can retrieve foreground objects completely without generating hollow characters as is clear from FIGS. 4c and 5c.

Another advantage of using the multi-scale Sauvola method is that large blobs will be generated for pictorial elements, which facilitates the text picture separation in step 130 as described below. This advantage is clearly shown when comparing FIGS. 5b and 5c which are the result of the Sauvola method and the multi-scale Sauvola method respectively. It is clear that, in the multi-scale Sauvola binarization method, pictorial blobs are merged into large blobs (see FIG. 5c), while, in the Sauvola binarization method, pictorial blobs are more fragmented (see FIG. 5b). As larger pictorial blobs are much easier to separate from textual blobs, the multi-scale Sauvola method offers a clear advantage.

It is clear for a skilled person that other binarization methods may also be used instead of or next to the Sauvola and the multi-scale Sauvola methods.

Figure 6:
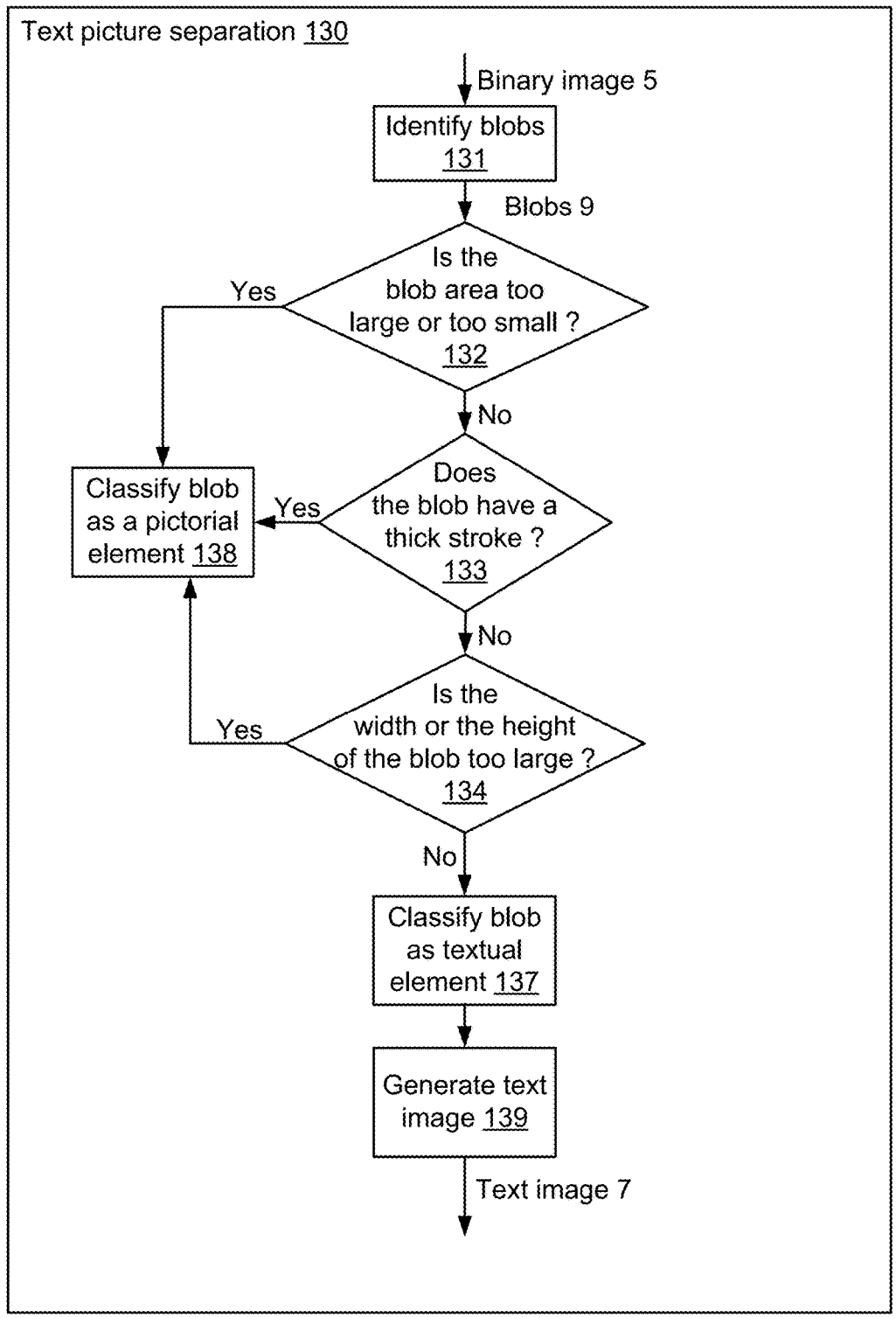
FIG. 6 shows a detailed flowchart of the text picture separation step used in the flowchart of FIG. 3.

FIG. 6 shows a detailed flowchart of the text picture separation step 130.

In step 131, the input binary image 5 is analyzed with a connected component analysis method and a plurality of blobs 9 is identified. As stated above, each blob 9 comprises a region of connected pixels, i.e. pixels having the same value, e.g. either 0 or 1.

In step 132, the number of pixels of each blob 9, i.e. the area value of a particular blob, is calculated and compared to pre-defined thresholds. If the number of pixels of a blob 9 is too large or too small, the blob 9 will be classified as a pictorial element in step 138. One of the pre-defined thresholds is based on empirical data that the binarization step 120 (see FIG. 3) generates large blobs for pictures. As described above, the multi-scale Sauvola method is very suited for generating these large pictorial blobs. Another one of the pre-defined thresholds is based on empirical data that blobs with a small amount of pixels usually belong to noise. Because, in many cases, the noise is generated by fragmented picture elements.

In step 133, blobs 9 whose strokes are categorized as thick, i.e. fat blobs, are classified as a pictorial element in step 138. A predefined value for categorizing a stroke as thick is based on empirical data that the stroke of normal text is usually thin, and thick strokes often appear in pictures. In a preferred embodiment, the predefined value with which the strokes are compared may be 16 pixels. However, it may happen that large text characters, such as titles, are regarded as fat blobs. Therefore, in a preferred embodiment, a threshold is set up to justify whether the blob is fat enough to be considered as pictorial element.

In step 134, blobs 9 whose width or height is too large will be classified as a pictorial element in step 138. Predefined values for categorizing a stroke as too large in width and/or height are based on empirical data that when the width or the height of a particular blob exceeds a certain threshold, there is a large chance that the particular blob belongs to a picture.

In a preferred embodiment, the predefined value with which the widths and/or heights are compared may be 128 pixels.

The blobs 9 that have not been classified as pictorial elements are classified as textual elements in step 137. These blobs can now be used to generate the text image 7 in step 139.

Further, it is clear for a skilled person that the ordering of the steps may also be changed, for example steps 132 to 134 can be applied in all possible sequences. Moreover, other and/or additional text blob filtering rules may also be used.

It is clear for a skilled person that other methods can also be applied for separating text and pictorial elements in a binary image 5. For example, in an embodiment of the invention, a multi-resolution morphological approach can be used to analyze the layout of the document image, to remove the pictorial elements and to keep the textural contents for further processing (D. S. Bloomberg, "Multiresolution morphological approach to document image analysis", International Conference on Document Analysis and Recognition, pp. 963-971, Saint-Malo, France, Sep. 30-Oct. 2, 1991).

Figure 7:
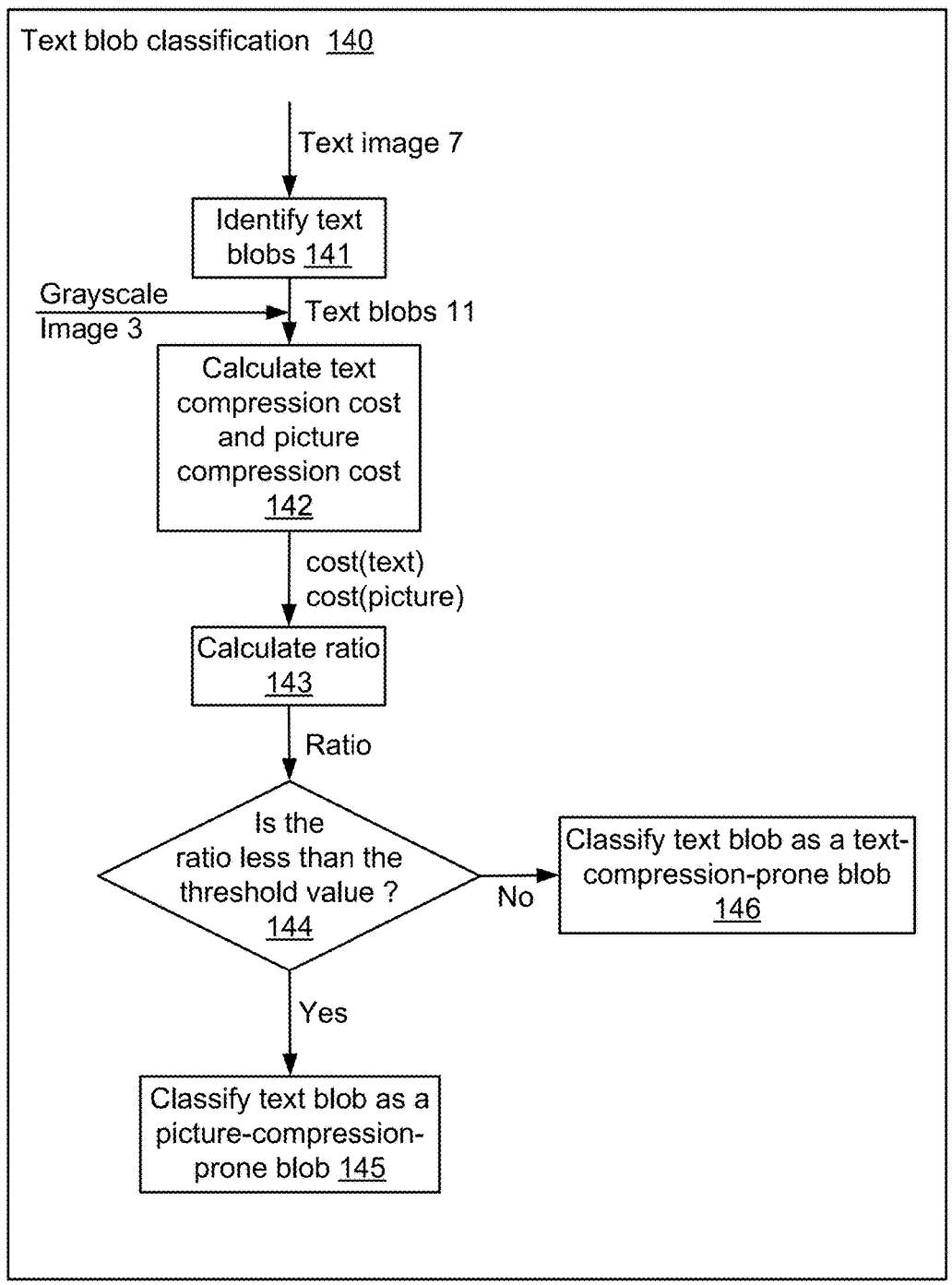
FIG. 7 shows a detailed flowchart of the text blob classification step used in the flowchart of FIG. 3.

FIG. 7 shows a detailed flowchart of the text blob classification step 140.

In step 141, the input text image 7 is analyzed and a plurality of text blobs 11 are identified. Each text blob 11 comprises a region of connected pixels, i.e. pixels having the same value, e.g. either 0 or 1.

In an embodiment, step 141 is not executed and the blobs 9 that were classified as textual elements in step 137 are used as text blobs 11.

In step 142, for each text blob 11, a compression cost will be calculated. The compression cost is derived from the Minimum Description Length principle. With the Minimum Description Length principle, it is determined whether the blob would be compressed as being part of the foreground layer or as being part of the background layer. If the blob is determined to be in the background, it would be compressed in the background image. If the blob is determined to be in the foreground, it would be compressed in the binary mask image and in the foreground image. Hence, two compression costs are calculated, namely a first cost, cost(picture), in which the text blob 11 would be compressed as a background element (equation (2)), and a second cost, cost(text), in which the text blob 11 would be compressed as a mask element and a foreground element (equation (3)):

$$\text{cost(picture)} = \text{cost(background)} \tag{2}$$

$$\text{cost(text)} = \text{cost(foreground)} + \text{cost(mask)}. \tag{3}$$

To calculate the compression cost, the grayscale pixel values are needed. Therefore, as illustrated in FIG. 7, the grayscale image 3 which was used in an earlier step as input for binarization is retrieved also as input for step 142.

In an embodiment, cost(background) is estimated as the sum of the errors between the pixel colors and the local average color, the local average color referring to the average color of the background pixels surrounding the particular pixel, i.e. its eight touching pixels. This estimation is based on the assumption that the color changes smoothly in the background image.

In an embodiment, cost(foreground) is estimated as the sum of the errors between the pixel colors and the average color, the average color referring to the average color of the foreground pixels within the particular blob of which the pixel forms a part. This estimation is based on the assumption that all the pixels of a blob have the same color for any foreground objects.

In an embodiment, cost(mask) depends on the perimeter of the blob and can be estimated with the following formula:

$$\text{cost(mask)} = \text{perimeter} * \text{factor}, \tag{4}$$

wherein 'factor' is a predefined value which is determined empirically.

In alternative embodiments, alternative compression cost estimation methods could be used.

In another embodiment, the errors are squared before making the sums, i.e. cost (background) is estimated as the sum of the squared errors between the pixel colors and the local average color and cost (foreground) is estimated as the squared sum of the errors between the pixel colors and the average color, the average color referring to the average color of the foreground pixels within the particular blob of which the pixel forms a part.

In yet another embodiment, the pixels surrounding the blob are also considered. A pixel surrounding the blob is a pixel of the background near the edge of the blob. Equation 3 then becomes:

$$\text{cost(text)} = \text{cost(foreground)} + \text{cost(surrounding)} + \text{cost(mask)} \tag{3'}$$

wherein cost (surrounding) is the sum (or the squared sum) of the errors between the surrounding pixels and the average color of the surrounding pixels multiplied by a factor, $f_s$, which is empirically determined by using image samples. This estimation is based on the assumption that all the pixels surrounding a blob should have the same color. This is often true for text elements printed on a homogenous background. Surrounding pixels are normally the background pixels touching the blob edges but it has been found that it is better to take as surrounding pixels, the background pixels distant by one pixel from the blob edges. This is because the colors of those pixels are more uniform at that distance.

In step 143, for each text blob 11, a ratio of both compression costs, i.e. cost (text) and cost (picture), is calculated. Equation (5) summarizes how the ratio is calculated:

$$\text{ratio} = \frac{\text{cost(text)}}{\text{cost(picture)}} \tag{5}$$

According to equation (5), a small cost(picture) and/or a large cost(text) lead to a high ratio, and vice versa.

To determine if a text blob 11 is better classified as a text-compression-prone blob or as a picture-compression-prone blob, the ratio calculated in step 143 should be compared to a threshold value. This is done in step 144. As shown in equation (6), if the ratio is smaller than a threshold, the text blob 11 would be compressed as if it was a pictorial element, and, as such, the text blob 11 is classified as a picture-compression-prone blob in step 145. Alternatively, if the ratio is larger than or equal to the threshold, the text blob 11 would be compressed as if it was a textual element, and, as such, the text blob 11 is classified as a text-compression-prone blob in step 146.

$$\begin{cases} \text{ratio} < \text{threshold} & \text{picture} - \text{compression} - \text{prone blob} \\ \text{ratio} \geq \text{threshold} & \text{text} - \text{compression} - \text{prone blob} \end{cases} \tag{6}$$

In an embodiment, the threshold value is set between 0 and 1, preferably between 0.45 and 0.6, and more preferably as 0.55. This value is determined based on empirical experiments.

As described above, in step 150, a quality assessment value is calculated based on the classification of the text blobs 11. In particular, as shown in equation (7), the ratio of the number of text-compression-prone blobs to the total number of text blobs 11, i.e. the sum of the number of text-compression-prone blobs and the number of picture-compression-prone blobs, is regarded as a document image quality assessment:

$$\text{quality} = \frac{\#(\text{text} - \text{compression} - \text{prone blob})}{\#(\text{text} - \text{compression} - \text{prone blob}) + \#(\text{picture} - \text{compression} - \text{prone blob})} \quad (7)$$

As described above, this quality assessment value is based on the empirical observation that, in the iHQC method, for a good quality image, it is more economic to compress text objects as textual elements rather than compress them as a pictorial elements. As such, in the iHQC method, for a good quality image, the majority of text objects are compressed as textual elements, while, for a low quality image, the majority of text objects are compressed as pictorial elements in the background. As such, a ratio of the number of text-compression-prone blobs to the total number of text blobs 11 forms a good indication of the quality of the document image. In particular, if the quality is high, the majority of text blobs 11 are text-compression-prone blobs, while, if the quality is low, the majority of text blobs 11 are picture-compression-prone blobs.

Figure 8:
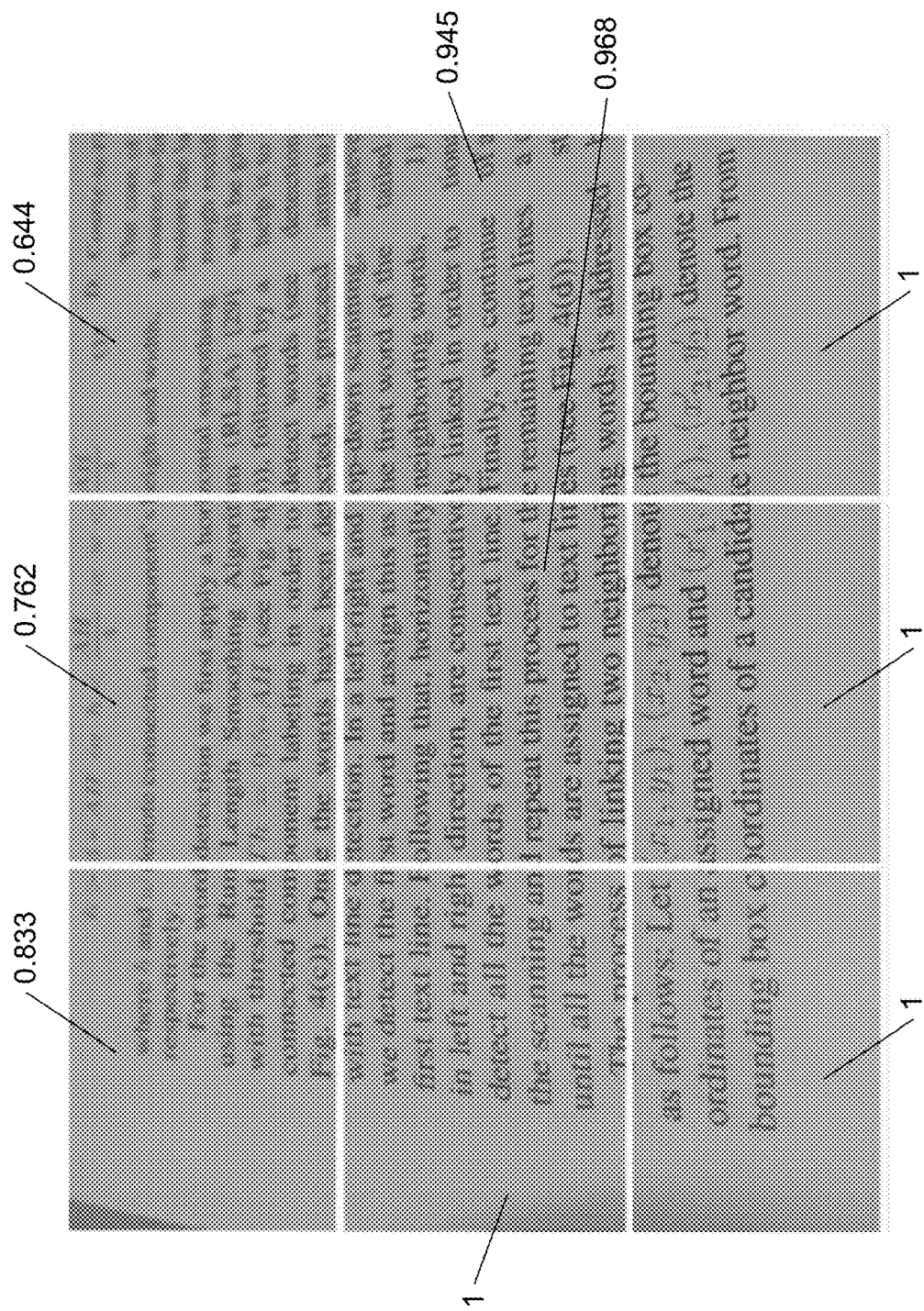
FIG. 8 shows the result of applying the method illustrated in FIG. 3 to multiple patches of an image independently.

In a, alternative embodiment, the quality assessment criterion comprises several image quality values depending on the location of the text blob 11 in the text image 7. These local image quality values can be defined as above. This embodiment is illustrated in FIG. 8 which illustrates the result of applying the quality assessment criterion to multiple patches of an input image 1 independently. Observation shows that, in the low image quality region, the quality evaluation value is low, while, in the high image quality region, the quality evaluation value is high. Specifically, going left-to-right and top-to-bottom, the image quality values are 0.833, 0.762, 0.644, 1, 0.968, 0.945, 1, 1 and 1 respectively.

The local image quality values can be advantageous for some applications. For example, assume that, for the same document, there are several captured images. It is possible to perform the proposed method on each patch of the different images and retrieve an array of image quality values that indicate local image qualities. Using this array, it is possible to select the image patches having the highest local quality. These image patches can then be merged into one artificial image having a better quality than any single one of the captured images.

In some embodiments of the present invention, the quality assessment method 100 is implemented on a hand held device, such as a smartphone, a camera, a tablet, etc. In this case, the method 100 may be used in real-time to instruct a user to take another image of a document when the quality assessment value is deemed not to be high enough to allow good accuracy OCR. Alternatively or supplementary, the hand held device may automatically take several images of a document and decide, using the quality assessment method 100, which of the several images has a high enough quality.

If none of the images have a high enough quality, the hand held device may automatically keep taking images until a good quality image has been taken.

In another embodiment, the quality assessment method 100 is implemented on a computer and/or a network system in which users upload document images. The computer/network may then determine the quality of the uploaded document images using the quality assessment method 100. If the quality is not high enough, the computer/network may instruct the user to upload a new document image with a higher quality.

The quality assessment method 100 has been tested using the publicly available DIQA database. This database contains 25 documents, which are extracted from publicly available data sets. For each document, 6 to 8 images were taken from a fixed distance to capture the whole page. The camera was focused at varying distances to generate a series of images with focal blur including one sharp image. A total of 25 such sets, each consisting of 6 to 8 high resolution images (3264 by 1840) were created using an Android phone with an 8 mega-pixel camera. The dataset has a total of 175 images. The text ground truth corresponding to each image is available as well. The character level accuracy for each captured image is calculated using ISRI-OCR evaluation tool.

Since the DIQA database provides images as well as their OCR accuracy, evaluation of the document image quality assessment method 100 is straightforward. The Spearman Rank Order Correlation Coefficient (SROCC) and the Pearson (Linear) Correlation Coefficient (LCC) were used to evaluate the correlation between the quality assessment value and the given OCR accuracy calculated using the DRS toolkit (an OCR engine from I.R.I.S.).

LCC is defined as:

$$\rho(A, B) = \frac{1}{N-1} \sum_{i=1}^{N} \left( \frac{A_i - u_A}{\sigma_A} \right) \left( \frac{B_i - u_B}{\sigma_B} \right) \quad (8)$$

with A and B being vectors of size N, and $\sigma_A$, $\sigma_B$ being their corresponding standard derivations. In particular, LCC is a measure of the degree of linear dependence between two variables. SROCC is defined as the Pearson correlation coefficient between the ranked variables:

$$\rho = 1 - \frac{6 \sum_{i=1}^{N} (A'_1 - B'_1)}{N(N^2 - 1)} \quad (9)$$

with A' and B' being ranked vectors of A and B. In particular, SROCC is a correlation measurement based on ranks. LCC and SROCC can be calculated globally or locally. Global LCC and SROCC examine the behavior of the measurement without any constrains on the target document object, while local LCC and SROCC are calculated when the target document is fixed. As such, in the DIQA database, there is local LCC and SROCC for each document object. Therefore, in total, there are 25 local LCC and SROCC values. As such, the median of the local LCC and SROCC will be used as a measurement of the overall performance.

The median local LCC and SROCC indicate how the quality assessment method 100 responds when taking images for the same document but with varying imaging conditions. The global LCC and SROCC indicate whether the quality assessment method 100 can be extended to other documents sharing the same imaging condition.

The performance measurements are recorded in Tables I and II. For the purpose of comparison to the method of the present invention as described above, three standard quality assessment methods have also been employed:

Laplacian max: in this method, Laplacian filtering is performed on the input image and, afterwards, the maximum value of the filtered image is taken as quality assessment value.

Laplacian standard deviation: in this method, Laplacian filtering is performed on the input image and, afterwards, the standard derivation of the filtered image is taken as quality assessment value.

Entropy: in this method, the entropy of the image is calculated using an image histogram.

TABLE I

LCC Performance

|  | Median Local LCC | Global LCC |
| --- | --- | --- |
| Laplacian Max | 0.7554 | 0.5917 |
| Laplacian Standard Derivation | 0.7846 | 0.5601 |
| Entropy | 0.6950 | 0.0856 |
| Invention method 100 | 0.9488 | 0.8523 |

TABLE II

SROCC Performance

|  | Median Local SROCC | Global SROCC |
| --- | --- | --- |
| Laplacian Max | 0.7143 | 0.6515 |
| Laplacian Standard Derivation | 0.9048 | 0.7059 |
| Entropy | 0.5714 | 0.0458 |
| Invention method 100 | 0.9375 | 0.8498 |

As shown in Tables I and II, compared to standard methods, the quality assessment method 100 has a clear advantage, as it has a higher correlation with OCR accuracies.

Similar tests were performed on low-resolution images, as, in real applications, low resolution images are often captured. For each of the high resolution images in DIQA database the spatial resolution was reduced by 2 in both the horizontal direction and the vertical direction, i.e. a 4-to-1 down sampling was used. The tests illustrated that the quality assessment method 100 also works on reduced resolution images.

The above tests were performed on a WIN7, Intel i7-3630QM CPU 2.4 GHz, RAM 20 GB computer running the WIN32 release program. The average runtime of the quality assessment method 100 was 265 milliseconds for an image from the high quality DIQA database and 64 milliseconds ford an image from the reduced resolution DIQA database.

Although aspects of the present disclosure have been described with respect to specific embodiments, it will be readily appreciated that these aspects may be implemented in other forms.

The invention claimed is:

1. A computer-implemented quality assessment method for assessing the quality of a document image to be processed in an OCR system prior to OCR processing, the method comprising the steps of, performed in a computerized system:
    a) processing the document image to a text image comprising a number of text blobs, each text blob comprising a region of connected pixels having the same value;
    b) classifying the text blobs in the text image in a first and second type of text blobs based on a calculation as to whether they will belong to a foreground layer in OCR processing or to a background layer in OCR processing; and
    c) generating a quality value for the document image prior to OCR processing based on the classified text blobs; wherein step b) further comprises:
        b1) calculating a text compression cost and a picture compression cost for each text blob;
        b2) calculating a ratio of the text compression cost and the picture compression cost for each text blob;
        b3) comparing said ratio to a predetermined threshold to determine if said ratio is less than the predetermined threshold;
        b4) classifying said text blob as a second type blob if the ratio is less than the predetermined threshold; and
        b5) classifying said text blob as a first type blob if the ratio is not less than the predetermined threshold.

2. The computer-implemented quality assessment method according to claim 1, characterized in that step b1) comprises:
    b11a) calculating a background compression cost for each text blob;
    b12a) calculating a foreground compression cost for each text blob; and
    b13a) calculating a mask compression cost for each text blob.

3. The computer-implemented quality assessment method according to claim 2, characterized in that step b1) further comprises:
    b14a) adding the foreground compression cost and the mask compression cost to calculate the text compression cost for each text blob; and
    b15a) equating the picture compression cost with the background compression cost for each text blob.

4. The computer-implemented quality assessment method according to claim 2, characterized in that
    step b11a) comprises calculating a sum of squares of grayscale differences between a target pixel in said text blob and its eight touching pixels;
    step b12a) comprises calculating a sum of squares of grayscale differences between a grayscale value of a target pixel in said text blob and an average grayscale value of pixels in the text blob; and
    step b13a) comprises calculating a perimeter of said text blob.

5. The computer-implemented quality assessment method according to claim 1, characterized in that step b1) comprises:
    b11b) calculating a background compression cost for each text blob;
    b12b) calculating a surrounding compression cost for each text blob;
    b13b) calculating a foreground compression cost for each text blob; and
    b14b) calculating a mask compression cost for each text blob.

6. The computer-implemented quality assessment method according to claim 5, characterized in that step b1) further comprises:

b15b) adding the foreground compression cost, the mask compression cost and the surrounding compression cost to calculate the text compression cost for each text blob; and b16b) equating the picture compression cost with the background compression cost for each text blob.

7. The computer-implemented quality assessment method according to claim 5, characterized in that step b11b) comprises calculating a sum of squares of grayscale differences between surrounding pixels and an average color of the surrounding pixels multiplied by a pre-set factor, the surrounding pixels being background pixels near an edge of the text blob;

step b12b) comprises calculating a sum of squares of grayscale differences between a grayscale value of a target pixel in said text blob and an average grayscale value of pixels in the text blob; and step b13b) comprises calculating a perimeter of said text blob.

8. The computer-implemented quality assessment method according to claim 1, characterized in that step c) comprises calculating a ratio of the number of first type blobs to the total number of text blobs.

9. The computer-implemented quality assessment method according to claim 1, characterized in that the document image is a color image and the method further comprises, prior to step a), processing the color image to form a grayscale image.

10. The computer-implemented quality assessment method according to claim 1, characterized in that step a) further comprises:

a1) binarizing the document image to form a binary image; and a2) separating text elements from the binary image to form the text image.

11. The computer-implemented quality assessment method according to claim 10, characterized in that step a2) comprises:

a21) identifying blobs in the binary image; and a22) classifying each blob as one of a pictorial element and a textual element.

12. The computer-implemented quality assessment method according to claim 11, characterized in that step a22) comprises:

classifying each blob as a pictorial element if the area of said blob is too large or too small compared to predefined thresholds.

13. The computer-implemented quality assessment method according to claim 11, characterized in that step a22) further comprises:

calculating a stroke of each blob; and classifying each blob as a pictorial element if the stroke of said blob is too large compared to a predefined threshold.

14. The computer-implemented quality assessment method according to claim 11, characterized in that step a22) further comprises:

calculating a width and a height of each blob; and classifying each blob as a pictorial element if at least one of the width and the height of said blob is too large compared to a predefined threshold.

15. The computer-implemented quality assessment method according to claim 1, wherein the first type of blob is a text-compression-prone blob and the second type of blob is a picture-compression-prone blob.

* * * * *